United States Patent [19]
Garneau et al.

[11] Patent Number: 5,195,034
[45] Date of Patent: * Mar. 16, 1993

[54] METHOD FOR QUASI-KEY SEARCH WITHIN A NATIONAL LANGUAGE SUPPORT (NLS) DATA PROCESSING SYSTEM

[75] Inventors: Denis Garneau, Toronto, Canada; Wen-Hsiu Sears, Fort Worth, Tex.

[73] Assignee: International Business Machines Corporation, Armonk, N.Y.

[*] Notice: The portion of the term of this patent subsequent to Dec. 31, 2008 has been disclaimed.

[21] Appl. No.: 779,693

[22] Filed: Oct. 21, 1991

Related U.S. Application Data

[63] Continuation of Ser. No. 458,046, Dec. 27, 1989, Pat. No. 5,077,669.

[51] Int. Cl.⁵ .............................................. G06F 15/38
[52] U.S. Cl. ...................................................... 364/419
[58] Field of Search ......................................... 364/419

[56] References Cited

U.S. PATENT DOCUMENTS

| | | | |
|---|---|---|---|
| 4,951,202 | 8/1990 | Yan | 364/419 |
| 4,954,955 | 9/1990 | Chiu | 364/419 |
| 5,137,383 | 8/1992 | Wong | 364/419 |

*Primary Examiner*—Robert A. Weinhardt
*Assistant Examiner*—Xuong Chung
*Attorney, Agent, or Firm*—Andrew J. Dillon

[57] ABSTRACT

The method of the present invention may be utilized with a National Language Support (NLS) data processing system which includes a plurality of sortable keys. Each sortable key within the data processing system is assigned an alphabetic key value, a diacritic key value, a case key value and a special character key value. After building these key values for each character or key within the system, a place value may be assigned to each unique character which is based upon these four values. Thereafter, when specifying criteria for a search through the data processing system all four key values may be specified, thus permitting a search to focus exactly upon a desired alphabetic value, diacritic character value, case value and special character value for the desired alphabetic string. Alternatively, in a second embodiment of the present invention, a "fuzzy" or "quasi" search may be implemented by searching for those characters or keys which match the desired alphabetic value but which ignore one or more of the other key values. That is, diacritic marks may be ignored or case distinctions may be ignored at the option of the system user. In this manner, a rapid and efficient search through a National Language Support (NLS) data processing system may be accomplished with selectable degrees of accuracy in the resultant match.

3 Claims, 3 Drawing Sheets

METHOD FOR QUASI-KEY SEARCH WITHIN A NATIONAL LANGUAGE SUPPORT (NLS) DATA PROCESSING SYSTEM

This application is a continuation of application Ser. No. 07/458,046, filed Dec. 27, 1989, now U.S. Pat. No. 5,077,669.

CROSS-REFERENCE TO RELATED APPLICATION

This application is related to U.S. patent application Ser. No. 07/458,044 filed of even date herewith by the inventors hereof and assigned to the assignee herein, entitled METHOD FOR PLACE VALUE ASSIGNMENT FOR SORTABLE KEYS IN A NATIONAL LANGUAGE SUPPORT (NLS) DATA PROCESSING SYSTEM and U.S. patent application Ser. No. 07/458,047 entitled METHOD FOR CULTURALLY PREDICTABLE KEY SORT WITHIN A NATIONAL LANGUAGE SUPPORT (NLS) DATA PROCESSING SYSTEM.

BACKGROUND OF THE INVENTION

1. Technical Field

The present invention relates in general to the field of data processing systems, and in particular to data processing systems designed to be utilized with multiple sets of keys and characters. Still more particularly, the present invention relates to data processing systems which permit the rapid and efficient searching of keys and characters from different national languages.

2. Description of the Related Art

It has long been recognized that the accommodation of new and different national user requirements in data processing systems is quite important. So-called National Language Support (NLS) has been a goal of many computer manufacturers for a number of years. However, NLS is far more than the mere conversion of a system to a second language. In order to truly support a national language, it is necessary to provide a universal product which may be adapted to any particular market. A true National Language Support product must operate with immunity from any problems which arise due to the use of different sets of characters or words. Such a system must include facilities to render the interacting characters or words different for each language. A National Language Support data processing system must permit the manufacturer to readily install each set of characters and to efficiently change from one set of characters to another set of characters. These multiple character sets must be serviceable and facilities must be provided to test and assure the various design implementations which result.

There exists a growing market requirement for data processing systems which include National Language Support due to the increased number of people operating computer systems who do not speak English or speak only limited English. Additionally, computer customers generally desire to become self-sufficient in installing and utilizing computer products and as a result, it is necessary to implement the data processing system and its support information in a manner which will permit this.

One problem which exists in previous implementations of National Language Support (NLS) data processing systems is the difficulty in implementing a search of alphabetic strings in such systems. For example, when searching for a particular alphabetic character string, it is necessary, in an ideal situation, to determine whether or not variations in diacritical marks or case will be acceptable to the searcher. In previously known language support data processing systems it has not been possible to provide such a distinction. That is, a search for a particular alphabetic character string which did not specify diacritical marks could fail to find a match which includes all desired criteria with diacritical marks.

Therefore, it should be apparent that a need exists for a National Language Support (NLS) data processing system in which it is possible to perform a search for matching alphanumeric character strings which may selectively include or ignore diacritic characters or other special characters.

SUMMARY OF THE INVENTION

It is therefore one object of the present invention to provide an improved data processing system.

It is yet another object of the present invention to provide an improved data processing system which will permit accurate searching through a plurality of National Language characters or keys.

It is yet another object of the present invention to provide an improved data processing system which will permit various levels of search through a plurality of National Language characters or keys.

The foregoing objects are achieved as is now described. The method of the present invention may be utilized with a National Language Support (NLS) data processing system which includes a plurality of sortable keys. Each sortable key within the data processing system is assigned an alphabetic key value, a diacritic key value, a case key value and a special character key value. After building these key values for each character or key within the system, a place value may be assigned to each unique character which is based upon these four values. Thereafter, when specifying criteria for a search through the data processing system all four key values may be specified, thus permitting a search to focus exactly upon a desired alphabetic value, diacritic character value, case value and special character value for the desired alphabetic string. Alternatively, in a second embodiment of the present invention, a "fuzzy" or "quasi" search may be implemented by searching for those characters or keys which match the desired alphabetic value but which ignore one or more of the other key values. That is, diacritic marks may be ignored or case distinctions may be ignored at the option of the system user. In this manner, a rapid and efficient search through a National Language Support (NLS) data processing system may be accomplished with selectable degrees of accuracy in the resultant match.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
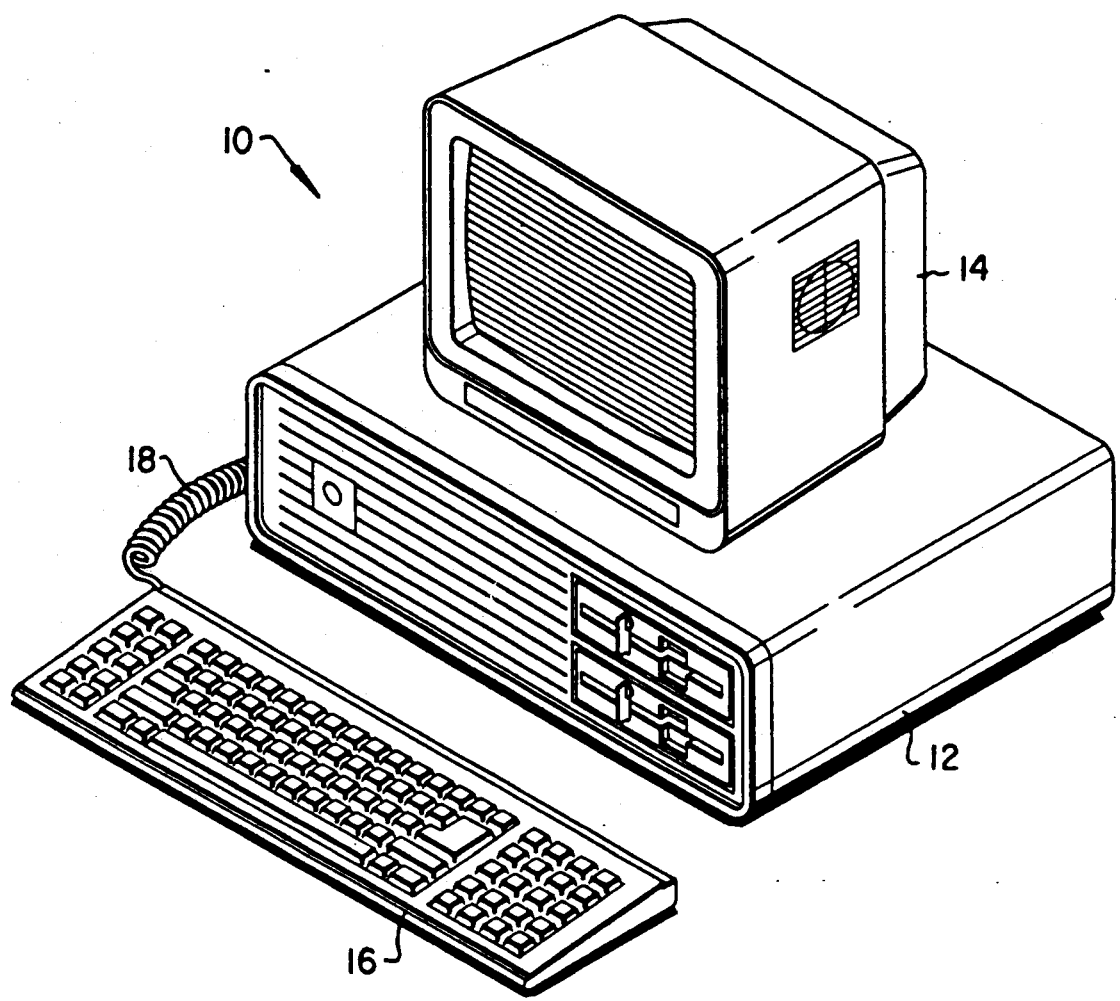
FIG. 1 is a pictorial representation of a data processing system which may be utilized to implement the method of the present invention.

With reference now to the figures and in particular with reference to FIG. 1, there is depicted a pictorial representation of a computer system 10 which may be utilized with a method of the present invention. AS may be seen, computer system 10 includes a processor 12 which preferably includes a graphics processor, memory device, and a central processor (not shown). Coupled to processor 12 is a video display 14 which may be implemented utilizing either a color or monochromatic monitor, in a manner well known in the computer art. Also coupled to processor 12 is keyboard 16. Keyboard 16 preferably comprises a standard computer keyboard which is coupled to processor 12 by means of cable 18 and which preferably includes various national language characters or keys which are unique to a particular language.

Upon reference to the foregoing, those skilled in the art will appreciate that computer 10 may be implemented utilizing a so-called personal computer, such as the Model 50 PS/2 computer manufactured by International Business Machines Corporation of Armonk, N.Y. Several applications which may be utilized on this computer, such as Office Vision/2, Release 2, may be utilized in a National Language Support system wherein multiple foreign language may be accommodated. For example, Office Vision/2, Release 2, will support English, German, French, Italian, Dutch, Portuguese, Belgian Dutch, Belgian French, Spanish, Danish, Icelandic, Finnish, Norwegian, Swedish, and Japanese. Additionally, other languages may be accommodated in future releases of such products.

In data processing systems which utilize characters or keys which may support these various national languages it has often been difficult to implement any type of sort procedure on the alphabetic characters contained within the system. One example in the prior art which has been utilized to implement such sort procedures is a binary sort in which the binary code of each character is utilized as the ranking value for each character and each alphabetic string is then sorted in this manner. A short example of a limited vocabulary which has been sorted utilizing this binary technique is listed below in Table I.

TABLE I

CO-OP
CONVEY
CONVEYANCE
COO
COOP
FRANK
Resume
co-op
coo
coop
frank
résumé

Upon reference to Table I, those skilled in the art will appreciate that by utilizing the binary code for each character in an alphabetic string the resultant sort is predictable; however, it will contain a sublist due to the fact that upper case and lower case letters are substantially separated, in binary code value.

Additionally, the binary sort technique will not accommodate the special characters, such as hyphen, or the accent marks which many foreign languages utilize.

Another technique which may be utilized to implement a more logically appealing sort technique is the shared weight technique. In the shared weight technique, each graphic character is grouped into a family of graphic characters wherein each group has a unique weight, whether or not a diacritical mark is also utilized and without distinction between upper case and lower case. Table II contains an example of a sort which has been implemented utilizing this technique.

TABLE II co-op
Convey
Coo
coo
COO
coop
Cooperate
Frank
frank
FRANK
résumé
Resume
resume Upon a review of Table II, those skilled in the art will appreciate that while the grouping this sort technique provides is more intrinsically appealing, since it does not contain a sublist, the results are unpredictable due to the inability of this sort technique to distinguish between upper and lower case letters or accented or unaccented characters.

Figure 2:
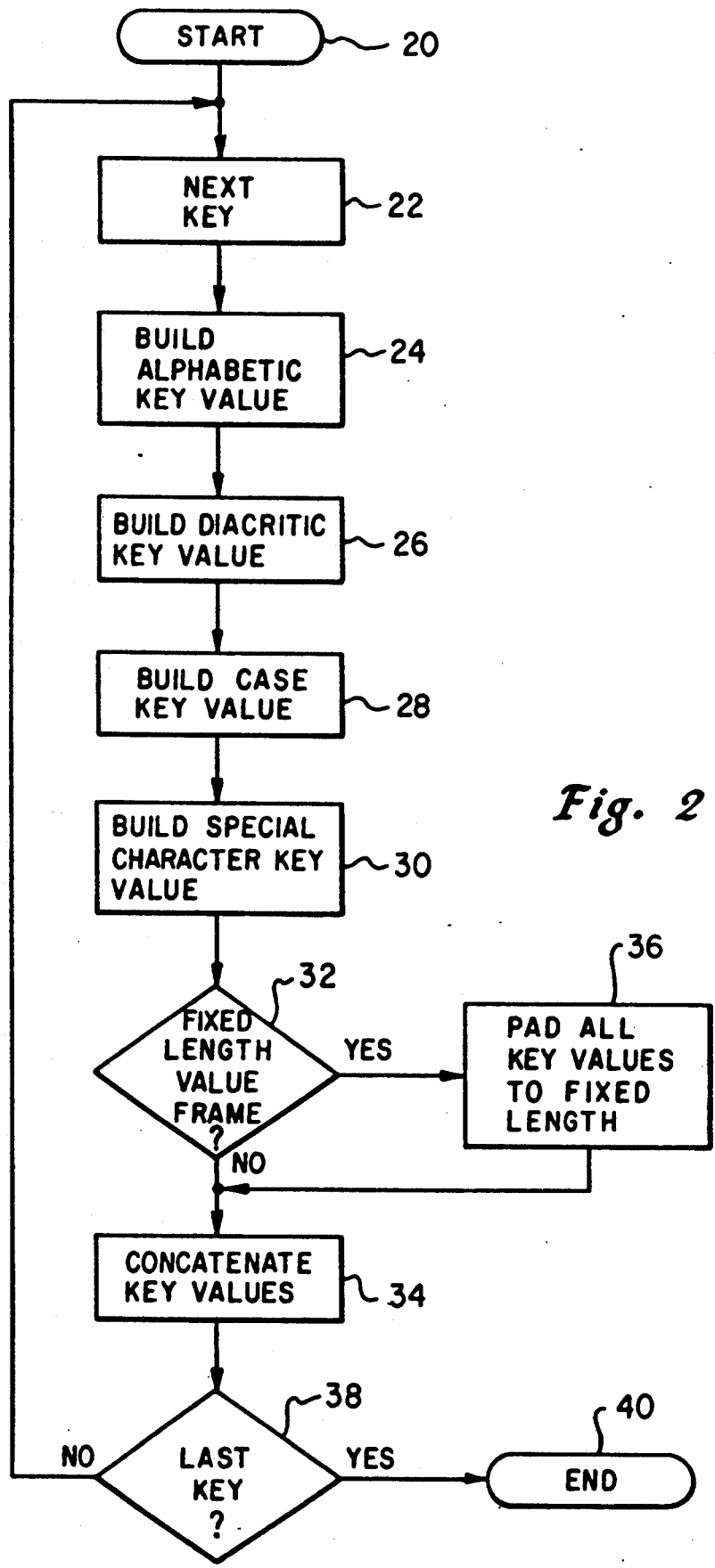
FIG. 2 is a logic flow chart illustrating the assignment of place values for national language characters utilizing the method of the present invention.

Referring now to FIG. 2, there is illustrated a logic flow chart which depicts the assignment of place values for National Language characters which utilizes the method of the present invention. As is illustrated, the process begins at block 20, and thereafter block 22 depicts the selection of the next key or character within an alphabetic string. Block 24 next illustrates the building of an alphabetic key value for that key character. In one embodiment of the present invention, the various key values assigned for each key or character may be implicitly weighted by selecting all values for a particular key value to be greater than the maximum value for a second or subsequent key value. In the embodiment depicted within FIG. 2, the alphabetic key values selected within block 24 may be selected such that minimum alphabetic key value contained therein is greater than any other key value which will be built. In this manner, the alphabetic key value will be entitled to the greatest weight during any type of sort procedure.

Next, block 26 depicts the building of a diacritic key value. Each diacritic key value will, in the disclosed embodiment of the present invention, represent a value which is less than the smallest alphabetic key value which as been assigned and which will represent the various diacritic marks which may be utilized in the selected National Language. Of course, those skilled in the art will appreciate that for alphanumeric characters which do not include a diacritic mark, the diacritic key value may be set to zero. Next, block 28 illustrates the building of a case key value. In the English language, this is a relatively simple evolution and only two possible case key values are required. For example, if it is desired to sort lower case alphabetic strings prior to upper case alphabetic strings, the lower case character will have a case key value of one and the upper case character will have a case key value of two. In this manner, any sort through a plurality of alphabetic character strings will always result in the desired order with respect to upper case and lower case values.

Finally, as illustrated in block 30, the fourth key value, the special character key value is built. Special character key values represent the rank value of the special characters which may be utilized in the selected language. For example, punctuation marks, parentheses, and various other non-alphanumeric characters. As discussed above, the special character key value of an alphanumeric character will preferably be set equal to zero.

At this point, block 32 illustrates a determination of whether or not the alphabetic character under analysis will include a fixed length value frame under associated therewith. In one embodiment of the present invention, each alphabetic character within the system will have associated therewith a fixed length value frame which will include within fixed subsets thereof each of the values previously determined for the various key values. That is, the alphabetic key value will be contained within a fixed number of columns within such a fixed length value frame. Similarly, the diacritic key value, case key value and special character key value will always include the same number of bits and will be contained within predetermined fixed subsets of the fixed length value frame. In such an implementation, it will be necessary, as illustrated in block 36, to pad all key values obtained to the necessary length to ensure that all alphabetic key values within a large number of such fixed length value frames will be aligned in an identical subset within each fixed length value frame.

Thereafter, as illustrated in block 34, the four key values herein constructed are concatenated to form a composite place value for a particular character or key within the system. In an alternate embodiment in which each alphabetic character does not include a fixed length value frame, all key values previously established are merely concatenated to form a composite place value indicator. When utilizing this technique, it will, of course, be necessary to assign various ranges of value to each key value to ensure that it is possible to clearly identify alphabetic key values from diacritic key values, etc. Thus, as discussed above, it will be necessary to constrain the values of each separate key to a particular range such that it will be possible to identify individual key values within a composite place value for a particular character. For example, the maximum value for any diacritic key value can be selected to be less than the minimum value for the least alphabetic key value. In this manner, alphabetic key values will be entitled to greater weight during any type of sort procedure. Of course, this weighting technique may be altered to conform to any desired sort rules.

Finally, block 38 illustrates a determination of whether or not the last key within a particular string has been considered and if so, the process terminates, as depicted in block 40. If not, the process returns to block 22 and the next key is selected. Thereafter, the process iterates and continues to build alphabetic key values, diacritic key values, case key values and special character key values for each key within the system.

By utilizing the foregoing technique of assigning multiple weights for each alphabetic character or key within a National Language Support (NLS) data processing system the alphabetic character strings contained therein may be easily and simply sorted. For example, the process may be applied to those words previously listed in Table I and II with the result illustrated in Table III below.

TABLE III coo
Coo
COO
coop
co-op
cooperate
frank
Frank
FRANK
resume
Resume
résumé

Figure 3:
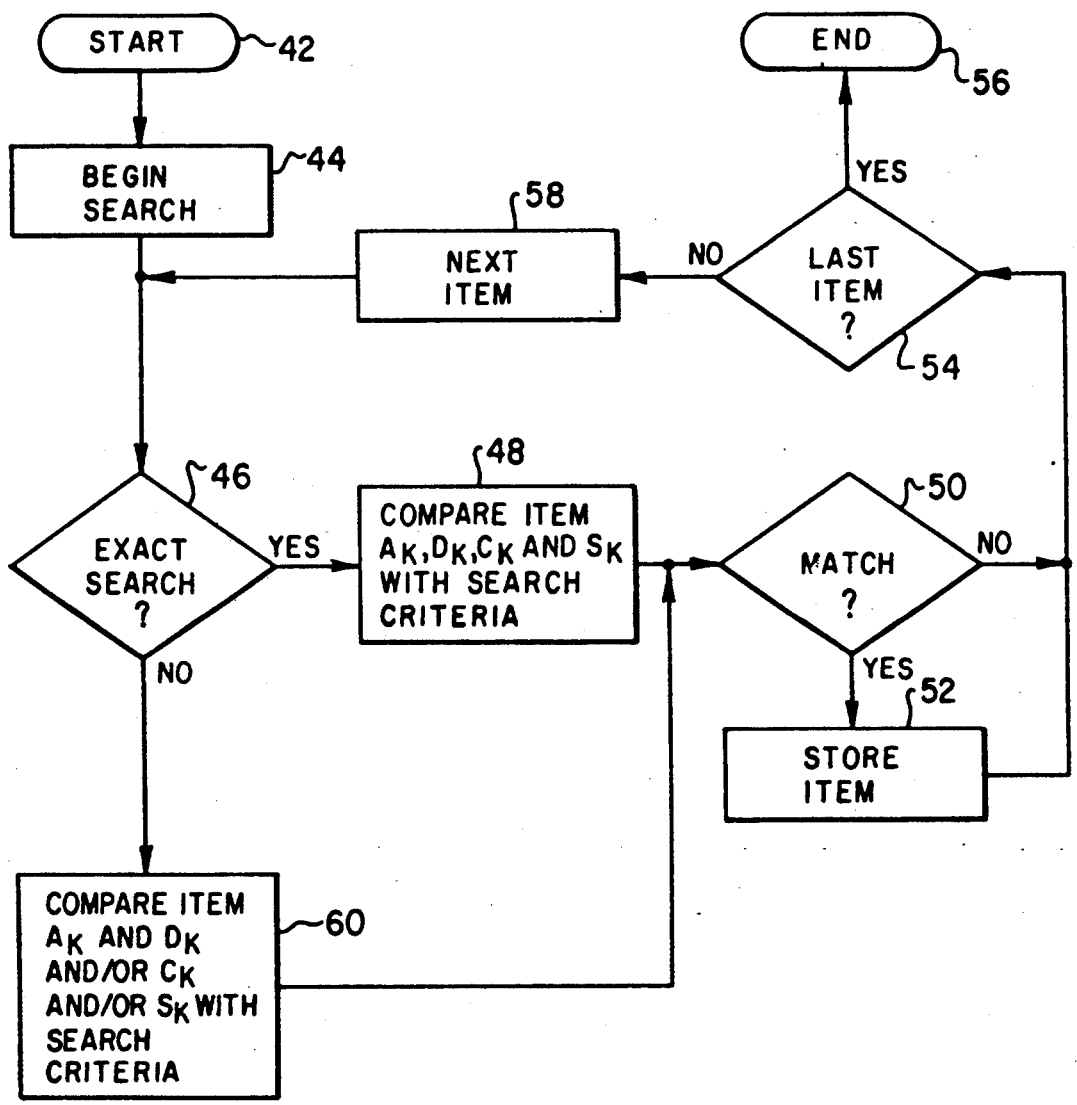
FIG. 3 is a logic flow chart illustrating the manner in which a search through the national language characters of a data processing system may be implemented utilizing the method of the present invention.

With reference now to FIG. 3, there is depicted a logic flow chart illustrating the implementation of a search through a plurality of national language characters in a data processing system utilizing the method of the present invention. As is illustrated, the process begins at block 42 and thereafter passes to block 44 which depicts the beginning of a search procedure. Block 46 depicts a determination of whether or not an exact search has been requested and, if so, block 48 illustrates the comparison of the alphabetic key, diacritic key, case key and special character key of each character or key within the system with the predesignated search criteria.

Block 50 is utilized to illustrate a determination of whether or not any individual character or key within the system is a match to the selected criteria and, if so, block 52 illustrates the storing of that item for future processing. If no match has been found the process passes to block 54 which illustrates a determination of whether or not the item under consideration is the last item within the search area. If so, the process terminates, as depicted in block 56.

In the event the item currently being compared to the search criteria is not the last item within the search area then block 58 depicts the obtaining of the next item and the process returns to block 46 wherein the nature of the search is once again determined by the system user.

Returning again to block 46, in the event the system user does not desire and exact search for a particular set of search criteria, then the process passes to block 60 which illustrates the performance of a "fuzzy" or "quasi" search. That is, a search in which one or more of the four weights assigned to each character or key within the data processing system is ignored for purposes of the search criteria. In the illustrated embodiment of the present invention, this is accomplished by comparing the alphabetic key value of each item within the search field to the search criteria while ignoring the diacritic key value, case key value or special character key value.

Of course, those skilled in the art will appreciate upon reference to the foregoing that by utilizing the method of the present invention, in which each character or key within a National Language Support (NLS) data processing system includes four separate weights, each attributable to a specific facet of a character or key, it will be possible to perform any number of specialized searches. For example, utilizing this technique it will be possible to search and locate every key or character within the system which incorporates a specific diacritical mark. Upon reference to the foregoing, those skilled in the art will appreciate that many other types of searches may be implemented utilizing this technique.

While the invention has been particularly shown and described with reference to a preferred embodiment, it will be understood by those skilled in the art that various changes in form and detail may be made therein without departing from the spirit and scope of the invention.

What is claimed is:

1. A data processing system for performing a search within a national language support data processing system having a plurality of sortable keys, said data processing system comprising:
    means for assigning a selected alphabetic key value for each of said plurality of sortable keys;
    means for assigning a selected diacritic key value for each of said plurality of sortable keys;
    means for assigning a selected case key value for each of said plurality of sortable keys; and
    means for selectively searching said plurality of sortable keys to locate each key having a particular alphabetic key value and a particular value for a selected one of either said diacritic key values or said case key values.

2. A data processing system for performing a search within a national language support data processing system having a plurality of sortable keys, said data processing system comprising:
    means for assigning a selected alphabetic key value for each of said plurality of sortable keys;
    means for assigning a selected diacritic key value for each of said plurality of sortable keys;
    means for assigning a selected case key value for each of said plurality of sortable keys;
    means for assigning a special character key value for each of said plurality of sortable keys; and
    means for selectively searching said plurality of sortable keys to locate each key having a particular alphabetic key value and a particular value for a selected one of said diacritic key values, or said case key values or said special character key values.

3. The data processing system for performing a search within a national language support data processing system according to claim 2, wherein said means for selectively searching said plurality of sortable keys comprises means for locating each key having a particular alphabetic key value and a particular value for each of a selected two of said diacritic key values, or said case key values or said special character key values.

* * * * *